(12) United States Patent
Srinivas et al.

(10) Patent No.: US 12,106,086 B2
(45) Date of Patent: Oct. 1, 2024

(54) CHECK DEPENDENCY AND SETUP WITH METAPROGRAMMING FOR LOW-CODE AND NO-CODE DEVELOPMENT

(71) Applicant: SAP SE, Walldorf (DE)

(72) Inventors: Jonala Srinivas, Singapore (SG); Xiang Cai, Singapore (SG); Qiu Shi Wang, Singapore (SG)

(73) Assignee: SAP SE, Walldorf (DE)

( * ) Notice: Subject to any disclaimer, the term of this patent is extended or adjusted under 35 U.S.C. 154(b) by 106 days.

(21) Appl. No.: 18/046,181

(22) Filed: Oct. 13, 2022

(65) Prior Publication Data

US 2024/0126523 A1    Apr. 18, 2024

(51) Int. Cl.
*G06F 8/61* (2018.01)
*G06F 9/445* (2018.01)

(52) U.S. Cl.
CPC ............ *G06F 8/61* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 9,274,784 B2 | 3/2016 | Wang et al. | |
| 9,405,524 B1 * | 8/2016 | Davis | G06F 8/65 |
| 9,471,303 B2 | 10/2016 | Zhou et al. | |
| 9,483,239 B2 | 11/2016 | Zhu et al. | |
| 9,672,032 B2 | 6/2017 | Zhou et al. | |
| 9,760,343 B2 | 9/2017 | Noens et al. | |
| 9,787,752 B2 | 10/2017 | Zhu et al. | |
| 9,794,329 B2 | 10/2017 | Chen et al. | |
| 9,952,835 B2 | 4/2018 | Wang et al. | |
| 10,365,922 B1 | 7/2019 | Wang et al. | |
| 10,521,196 B1 | 12/2019 | Wang et al. | |
| 10,623,276 B2 * | 4/2020 | Ko | H04L 43/08 |
| 2008/0127175 A1 * | 5/2008 | Naranjo | G06F 8/61 717/174 |

(Continued)

OTHER PUBLICATIONS

U.S. Appl. No. 17/471,328, filed Sep. 10, 2021, Wang et al.

(Continued)

*Primary Examiner* — Marina Lee
(74) *Attorney, Agent, or Firm* — Fish & Richardson P.C.

(57) ABSTRACT

Methods, systems, and computer-readable storage media for retrieving, by a smart setup system, a component configuration metadata file corresponding to an application, the component configuration metadata file including component metadata representing components that the application uses during runtime, parsing, by a parser of the smart setup system, the component configuration metadata file to provide a set of data objects, each corresponding to a respective component in the set of components, providing, by an emitter of the smart setup system, a set of checking scripts and a set of installation scripts by, for each component in the set of components, providing a checking script and an installation script using a respective data object, and executing, by the smart setup system, each checking script in the set of checking scripts, and in response, receiving a set of check results, each check results indicating whether prerequisites of a respective component are met.

20 Claims, 8 Drawing Sheets

(56) References Cited

U.S. PATENT DOCUMENTS

| | | | |
|---|---|---|---|
| 2015/0082298 A1* | 3/2015 | Wang | G06F 8/60 |
| | | | 717/174 |
| 2015/0089403 A1 | 3/2015 | Zhu et al. | |
| 2020/0110591 A1* | 4/2020 | Buczkowski | G06F 8/62 |
| 2020/0379742 A1* | 12/2020 | Saluja | G06F 9/44505 |
| 2020/0380432 A1 | 12/2020 | Wang et al. | |
| 2021/0064984 A1 | 3/2021 | Wang et al. | |
| 2022/0019932 A1 | 1/2022 | Wang et al. | |

OTHER PUBLICATIONS

U.S. Appl. No. 17/646,890, filed Jan. 4, 2022, Wang et al.
U.S. Appl. No. 17/830,588, filed Jun. 2, 2022, Cai et al.
U.S. Appl. No. 17/830,598, filed Jun. 2, 2022, Zhou et al.
U.S. Appl. No. 17/839,787, filed Jun. 14, 2022, Zhou et al.
U.S. Appl. No. 17/951,894, filed Sep. 23, 2022, Wang et al.

\* cited by examiner

```
{
    "id": "xmake",                                          200
    "title": "xMake",
    "platform": "iOS",
    "url": "https://github.wdf.sap.corp/dtxmake/xmake",
    "description": "A build tools created by SAP.",
    "dev": true,
    "check": [
        {
            "id": "version",
            "title": "Version",
            "cmd": "x-make-version.sh",
            "cli-path": true,
            "extract-version": "xmake-cli\\s*([\\d\\.]*)",
            "valid": ">= 1.1.10"
        }
    ],
    "install": [
        {
            "id": "install",
            "cmd": "x-make-install.sh",
            "cli-path": true
        }
    ],
    "uninstall": [
        {
            "id": "uninstall",
            "cmd": "x-make-uninstall.sh",
            "cli-path": true
        }
    ]
},
{
    "id": "nativescript",
    "title": "NativeScript",
    "platform": "Common",
    "url": "https://www.nativescript.org/",
    "description": "Open source framework for ...",
```

-- from FIG. 2A --

```
        "check": [
            {
                "id": "version",
                "title": "Version",
                "cmd": "nativescript-version.sh",
                "cli-path": true,
                "extract-version": "^([\\d\\.]*)",
                "valid": "== 8.0.2"
            }
        ],
        "install": [
            {
                "id": "install",
                "cmd": "nativescript-install.sh",
                "args": [
                    "8.0.2"
                ],
                "cli-path": true,
                "sudo": true
            },
            {
                "id": "update_pods",
                "cmd": "cocoapods-update.sh",
                "cli-path": true
            }
        ],
        "uninstall": [
            {
                "id": "uninstall",
                "cmd": "nativescript-uninstall.sh",
                "cli-path": true,
                "sudo": true
            }
        ]
    },
```

*-- from FIG. 2B --*

```
        "id": "swiftlint",
        "title": "SwiftLint",
        "platform": "iOS",
        "url": "https://github.com/realm/SwiftLint",
        "description": "A tool to enforce Swift style ...",
        "dev": true,
        "check": [
            {
                "id": "version",
                "title": "Version",
                "cmd": "swiftlint-version.sh",
                "cli-path": true,
                "extract-version": "^([\\d\\.]*)",
                "valid": "== 0.26.0"
            }
        ],
        "install": [
            {
                "id": "install",
                "cmd": "swiftlint-install.sh",
                "args": [
                    "0.26.0"
                ],
                "cli-path": true,
                "sudo": true
            }
        ],
        "uninstall": [
            {
                "id": "uninstall",
                "cmd": "swiftlint-uninstall.sh",
                "cli-path": true,
                "sudo": true
            }
        ]
    }
]
```

*FIG. 2C*

CHECK DEPENDENCY AND SETUP WITH METAPROGRAMMING FOR LOW-CODE AND NO-CODE DEVELOPMENT

BACKGROUND

Enterprises use software systems to conduct operations. Example software systems can include, without limitation, enterprise resource management (ERP) systems, customer relationship management (CRM) systems, human capital management (HCM) systems, and the like. In some software systems, processes that underly operations of an enterprise are programmatically defined to enable execution of the processes using the software systems. A workflow can be executed using a set of technologies and tools that enable documents, information, activities, and tasks to flow appropriately in an enterprise or a department of an enterprise.

Applications are developed during design-time in design-time environments and are deployed to runtime environments for production use during runtime. However, applications include dependencies on various services and/or components that can be distributed across different environments. Example environments can include, without limitation, a cloud-based environment, an on-premise environment, and an on-device environment. For example, and without limitation, an application can use an authentication service that executes in a cloud-based environment and can interact with a database system that is provided in an on-premise environment. For development and deployment of applications, the existence of the services and/or components needs to be checked, versions of the services/components need to be validated (e.g., a version of a service to be used by the application is available), and the services/components need to be downloaded (e.g., command line or user interface) to the appropriate environments (e.g., for design-time, runtime).

Performing such tasks, however, is time- and resource-intensive and typically requires highly skilled and experienced developers in multiple disparate technologies. Further, numerous technical resources need to be provisioned, deployed, and consumed for design-time development and runtime deployment of applications.

SUMMARY

Implementations of the present disclosure are directed to a smart setup system that checks dependencies of an application (e.g., components and versions of components that the application uses) and that sets up the environments for deployment. More particularly, implementations of the present disclosure provide a smart setup system that checks the availability of components that an application depends on, validates versions of the components, and downloads and deploys the components to respective environments.

In some implementations, actions include retrieving, by a smart setup system, a component configuration metadata file corresponding to an application, the component configuration metadata file including component metadata representing components in a set of components that the application uses during runtime, parsing, by a parser of the smart setup system, the component configuration metadata file to provide a set of data objects, each data object corresponding to a respective component in the set of components, providing, by an emitter of the smart setup system, a set of checking scripts and a set of installation scripts by, for each component in the set of components, providing a checking script and an installation script using a respective data object, and executing, by the smart setup system, each checking script in the set of checking scripts, and in response, receiving a set of check results, each check results indicating whether pre-requisites of a respective component are met. Other implementations of this aspect include corresponding systems, apparatus, and computer programs, configured to perform the actions of the methods, encoded on computer storage devices.

These and other implementations can each optionally include one or more of the following features: a data object includes, for a respective component, a set of properties and a set of functions; providing a checking script and an installation script includes receiving a checking script template and an installation script template from a template repository, and replacing one or more template variables in each of the checking script template and the installation script template with component metadata to provide the checking script and the installation script; actions further include executing, by the smart setup system, each checking script in the set of checking scripts to install a respective component to one or more environments; the one or more environments include a cloud environment, an on-premise environment, and an on-device environment; the application depends on the components in the set of components; and the pre-requisites include a version and a platform.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 2A-2C collectively depict example component configuration metadata in accordance with implementations of the present disclosure.

Like reference symbols in the various drawings indicate like elements.

DETAILED DESCRIPTION

Figure 1:
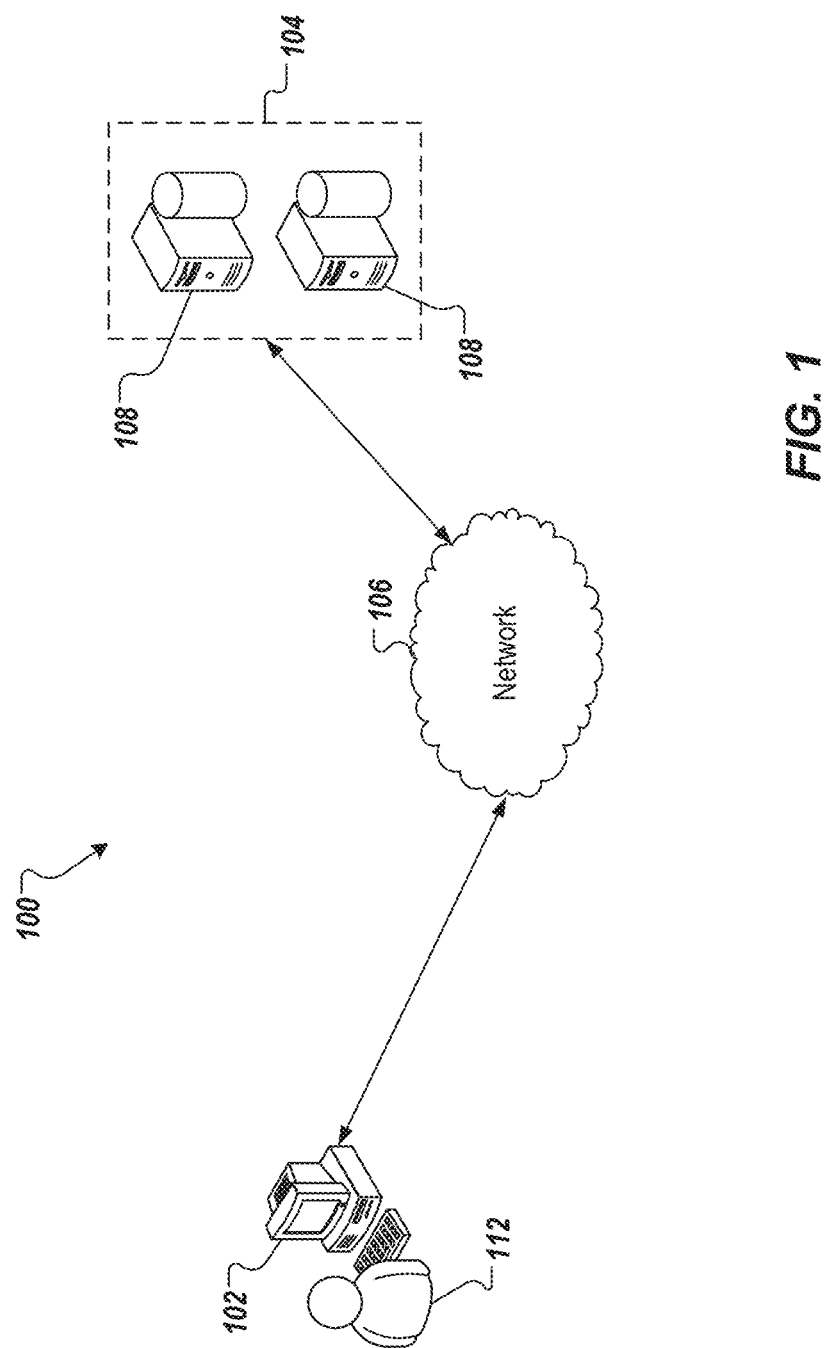
FIG. 1 depicts an example architecture that can be used to execute implementations of the present disclosure.

Implementations of the present disclosure are directed to a smart setup system that checks dependencies of an application (e.g., components and versions of components that the application uses) and that sets up the environments for deployment. More particularly, implementations of the present disclosure provide a smart setup system that checks the availability of components that an application depends on, validates versions of the components, and downloads and deploys the components to respective environments.

In some implementations, actions include retrieving, by a smart setup system, a component configuration metadata file corresponding to an application, the component configuration metadata file including component metadata representing components in a set of components that the application uses during runtime, parsing, by a parser of the smart setup system, the component configuration metadata file to provide a set of data objects, each data object corresponding to a respective component in the set of components, providing, by an emitter of the smart setup system, a set of checking scripts and a set of installation scripts by, for each component in the set of components, providing a checking script and an installation script using a respective data object, and executing, by the smart setup system, each checking script in the set of checking scripts, and in response, receiving a set of check results, each check results indicating whether pre-requisites of a respective component are met.

As used herein, the terms low-code and no-code generally refer to software development platforms and/or tools that are targeted at users with little or no development experience (e.g., referred to as citizen developers, or low-code/no-code (LCNC) developers). Another target of such platforms and/or tools can include more experienced developers having shorter timeframes for development (e.g., LCNC enabling developers to develop more quickly). Here, low-code can refer to development requiring some level of coding experience, while no-code can refer to development with no coding experience. In the context of implementations of the present disclosure, low-code (no-code) extension developers generally refers to developers of extensions to applications, who have limited development experience and/or are under tight timeframes to develop application extensions. While the present disclosure references low-code developers and/or no-code developers, collectively LCNC developers or citizen developers, it is appreciated that implementations of the present disclosure can be realized for the benefit of more sophisticated developers.

To provide further context for implementations of the present disclosure, and as introduced above, enterprises use software systems, also referred to as applications, to conduct operations. Example software systems can include, without limitation, applications for enterprise resource management (ERP) systems, customer relationship management (CRM) systems, human capital management (HCM) systems, and the like. In some applications, processes that underly operations of an enterprise are programmatically defined to enable execution of the processes using the software systems.

Applications are developed during design-time in design-time environments and are deployed to runtime environments for production use during runtime. However, applications include dependencies on various services, programs, applications, and/or sub-applications (collectively referred to herein as components) that can be distributed across different environments. Example environments can include, without limitation, a development environment (e.g., development operating system (OS)) a cloud-based environment, an on-premise environment, and an on-device environment (e.g., device OS). For example, and without limitation, an application can use an authentication component that executes in a cloud-based environment and can interact with a database system that is provided in an on-premise environment. For development and deployment of applications, the existence of the components needs to be checked, versions of the components need to be validated (e.g., a version of a component to be used by the application is available), and the components need to be downloaded and deployed to the appropriate environments (e.g., for design-time, runtime).

Performing such tasks, however, is time- and resource-intensive and typically requires highly skilled and experienced developers in multiple disparate technologies. Further, numerous technical resources need to be provisioned, deployed, and consumed for design-time development and runtime deployment of applications. Even large enterprises, however, often lack such skills and resources for performing such tasks, presenting a significant technical obstacle for enterprises. To mitigate these technical issues, enterprises seek technologies that reduce time- and resource-consumption and that enable less experienced developers, such as LCNC (citizen) developers to manage such tasks.

In view of the above context, implementations of the present disclosure provide a meta-programming technology that checks dependencies of an application (e.g., components and versions of components that the application uses) and that sets up the environments for deployment. More particularly, implementations of the present disclosure provide a smart setup system that checks the availability of components that an application depends on, validates versions of the components, and downloads and deploys the components to respective environments. As described in further detail herein, implementations of the smart setup system of the present disclosure process a component configuration metadata file (e.g., provided in Javascript object notation (JSON) format) to generate and configure setup scripts and commands. In some examples, a user interface (UI) is provided to enable a user (e.g., LCNC developer) to manipulate the setup scripts and/or the commands on-the-fly prior to execution.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smartphone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more cloud-based applications.

In accordance with implementations of the present disclosure, the server system 104 can host a smart setup system. As described in further detail herein, the smart setup system can be used to deploy applications and components that the application depends on to one or more environments. For example, the user 112 can be a developer (e.g., LCNC developer) that interacts with the smart setup system to deploy applications and components that the application depends on to one or more environments by, for example, checking the availability of components that an application depends on, validating versions of the components, and downloading and deploying the components to respective environments.

In some implementations of the smart setup system of the present disclosure executes pre-requisite checking and environment setup based on a component configuration metadata file (e.g., provided in JSON format). In some examples, the component configuration metadata file is an artifact that results from development of an underlying application. In some examples, content of the component configuration metadata file is explicitly specified by application developer during development time in the development environment and/or content is implicitly populated during application build and packaging.

FIGS. 2A-2C collectively depict an example portion of component configuration metadata 200 in accordance with implementations of the present disclosure. In the example of FIGS. 2A-2C, the example portion of component configuration metadata 200 is provided in JSON format. In some examples, the component configuration metadata can be stored in a computer-readable file, referred to herein as a component configuration metadata file (e.g., a JSON file).

In the example of FIGS. 2A-2C, component metadata represents components (e.g., xmake, which can be described as a cross-platform build utility). In this example, the component is for a runtime environment (e.g., iOS) and is available at a uniform resource locator (URL) (e.g., https://github.wdf.sap.corp/dtxmake/xmake). In this example, version check metadata for the component indicates valid versions (e.g., equal to or later than version 1.1.10), install metadata indicates an install command (e.g., x-make-install.sh) that is to be executed in a command line interface (CLI) to install the first component, and uninstall metadata indicates an uninstall command (e.g., x-make-uninstall.sh) that is to be executed in a CLI to uninstall the respective component. In the example of FIGS. 2A-2C, metadata indicates other components (e.g., nativescript, swiftlint) and, for each, runtime environment that the component is to be installed in, URL to retrieve the component from, version check metadata, install metadata, and uninstall metadata.

Although not depicted in the example of FIGS. 2A-2C, one or more components can also be dependent on one or more other components. For example, an application can use a first component, and the first component can use a second component. In this example, the second component can be considered a sub-component (or nested component) of the first component. Metadata can be included in the component configuration metadata to represent any such sub-components as, for example, nested components of higher-level components. For example, and continuing with the example above, the application can be the highest level, the first component can be a next-lower level, and the second component can be a next-next-lower level nested within the next-lower level.

Figure 3:
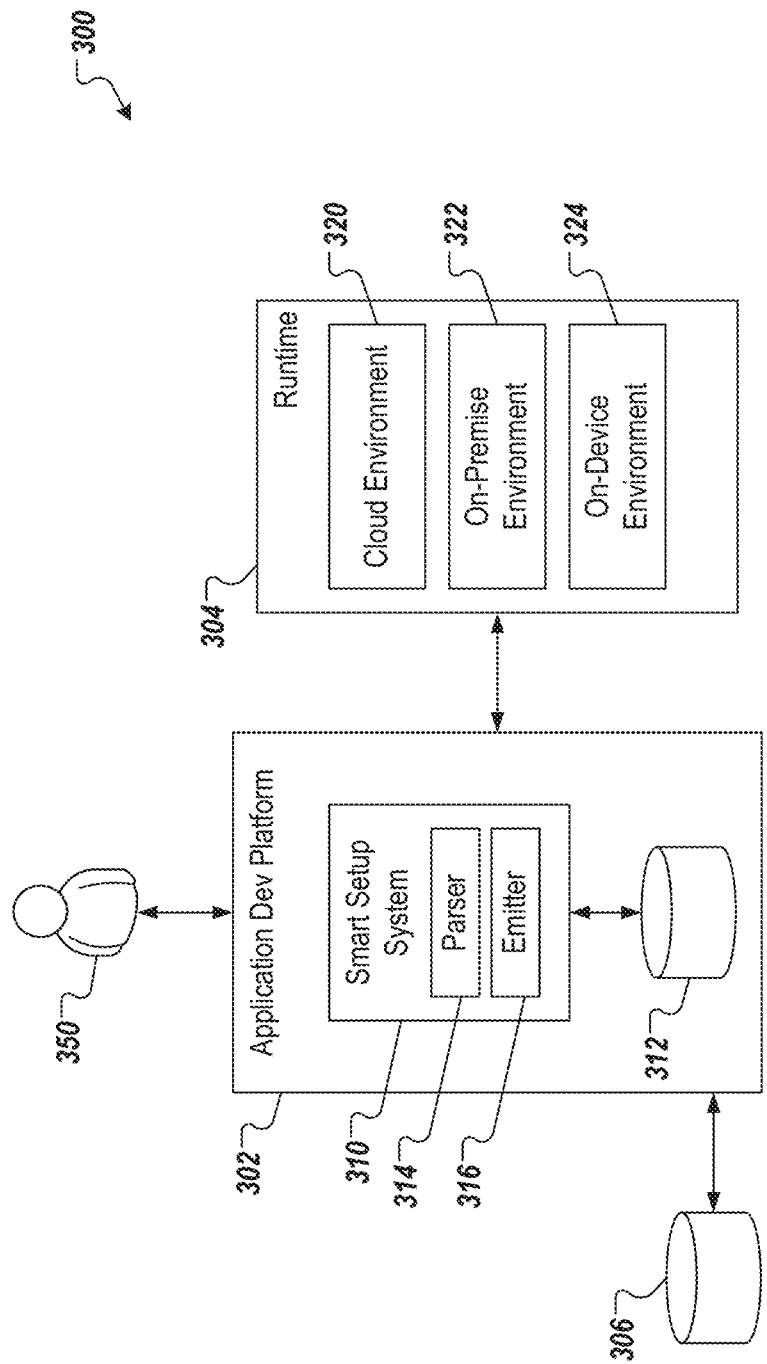
FIG. 3 depicts an example architecture in accordance with implementations of the present disclosure.

FIG. 3 depicts an example architecture 300 in accordance with implementations of the present disclosure. In the example of FIG. 3, the example architecture 300 includes an application development platform 302, a runtime 304, and a script repository 306. In the example of FIG. 3, a user 350 (e.g., LCNC developer) can interact with the application development platform 302, as described in further detail herein.

The application development platform 302 includes a smart setup system 310 and a repository 312. The smart setup system 310 includes a parser 314 and an emitter 316. The runtime 304 is representative of multiple runtime environments that an application and one or more components that the application uses can be deployed to. In the example of FIG. 3, the runtime 304 includes a cloud environment 320, an on-premise environment 322, and an on-device environment 324 (e.g., iOS, Android OS). The script repository 306 can be described as a knowledge base that stores script templates to create check scripts and installation scripts, as described in further detail herein. For example, for each component that is available for consumption by applications, the script repository 306 can store checking script templates and installation script templates for respective environments that the component can be deployed to.

Although the smart setup system 310 of the present disclosure is depicted as part of the application development platform 302, it is contemplated that the smart setup system 310 can be provisioned independent from the application development platform 302 or can be provided within any appropriate platform.

In some implementations, the smart setup system 310 executes pre-requisite checking and environment setup based on a component configuration metadata file (e.g., provided in JSON format). In some examples, the component configuration metadata file can be stored in and retrieved from the repository 312. For example, the repository 312 can store a library of component configuration metadata files, each file corresponding to a respective application. In some examples, the component configuration metadata file can be retrieved based on an identifier that uniquely identifies the application, to which the component configuration metadata file corresponds.

With regard to pre-requisite checking, a pre-requisite check UI can be generated based on at least a portion of the metadata of the component configuration metadata file and can be displayed to the user 350. In some examples, the pre-requisite check UI guides the user 350 through pre-requisite checking before any components are installed. In some examples, the parser 310 parses the metadata stored within the component configuration metadata file to identify components, and any sub-components thereof. In some examples, for each component represented in the component configuration metadata file, the parser provides a data object (e.g., a Javascript Object). In some examples, the data object stores properties and functions of a respective component.

For example, and with reference to FIG. 2A, an example data object can include Javascript Object xmake { }, which has properties, id, platform, version, and the like, and functions check( ) and install( ), and the like as represented below in Listing 1:

Listing 1: Example Data Object for xmake Component

```
const xmake = {
  id: "xmake",
  platform : "iOS",
  version : "1.1.10",
  ...
  check : function(id, platform, version) {
    execSync ("xmake-check sh");
  }
  install : function(id, platform, version) {
    execSync ("xmake-install.sh");
  }
  ...
};
```

As another example, and with reference to FIGS. 2A and 2B, an example data object can include Javascript Object nativescript { }, which has properties, id, platform, version, and the like, and functions check( ) and install( ), and the like as represented below in Listing 2:

Listing 2: Example Data Object for nativescript Component

```
const nativescript = {
  id: "nativescript",
  platform : "common",
  version : "8.0.2",
  ...
  check : function(id, platform, version) {
    execSync ("nativescript-check.sh");
  }
  install : function(id, platform, version) {
    execSync ("nativescript-install.sh");
  }
  ...
};
```

In some implementations, the data objects are provided as input to the emitter 316, which retrieves, for each component, a checking script template and an installation script template, and provides a checking script and an installation script, respectively. For example, the emitter 316 can query the script repository 306 using a query that indicates properties of a component (e.g., id, platform, version) and the script repository 306 can return a query result that includes a checking script template and an installation script template for the respective component. In some examples, each template includes one or more template variables.

For example, and with non-limiting reference to the xmake component discussed herein, the script repository 306 can return a checking script template, such as that represented below in Listing 3:

Listing 3: Example Checking Script Template

```
pip3 list | grep xmake-cli | grep $(version)
```

In the example of Listing 3, $ (version) is a template variable for a version of the component. In some examples, the emitter 316 replaces the template variable(s) with respective value(s). For example, and continuing with non-limiting reference to the xmake component discussed herein, the emitter 316 can provide a checking script such as that represented below in Listing 4:

Listing 4: Example Checking script

```
#!/bin/bash
base_dir=$(dirname "$0")
. "${base_dir}/prepare-env.sh"
pip3 list | grep xmake-cli | grep "1.1.10"
```

As another example, and with non-limiting reference to the xmake component discussed herein, the script repository 306 can return an installation script template, such as that represented below in Listing 5:

Listing 5: Example Installation Script Template

```
pip3 install xmake-cli -version $(version) --index-url
https://int.repositories.cloud.com/artifactory/build-
milestones.pypi/simple/ --trusted-host int.repositories.cloud.com
```

In the example of Listing 5, $ (version) is a template variable for a version of the component. In some examples, the emitter 316 replaces the template variable(s) with respective value(s). For example, and continuing with non-limiting reference to the xmake component discussed herein, the emitter 316 can provide an installation script such as that represented below in Listing 6:

Listing 6: Example Installation Script

```
#!/bin/bash
base_dir=$(dirname "$0")
. "${base_dir}/prepare-env.sh"
pip3 install xmake-cli -version "1.1.10" --index-url
https://int.repositories.cloud.com/artifactory/build-
milestones.pypi/simple/ --trusted-host
int.repositories.cloud.com
```

In some implementations, for each component, the smart setup system provides a component interface within the pre-requisite check UI. In some examples, the component interface can indicate a name of the component (e.g., determined from "title": metadata), a description of the component (e.g., determined from "description": metadata), and a platform (environment) that the component is to execute in (e.g., determined from "platform": metadata).

In accordance with implementations of the present disclosure, the user 350 can select individual or all components for pre-requisite checking (e.g., by selecting respective UI elements, such as individual select boxes or a select all box). In some examples, pre-requisites are checked only for components indicated by the user 350. In some examples, if the user 350 selects all, pre-requisites are checked for all components. In some examples, if pre-requisites are to be checked for multiple components (e.g., the user 350 selects all), the pre-requisites are checked for components recursively, also accounting for nested components, if any. For example, pre-requisites can be checked for components in an order that the components are identified in the component configuration file. However, for any component having one or more nest components, pre-requisites are checked for the nested component(s) before moving on to any other component(s) in the order.

In response to a request to check the pre-requisites of a component, the smart setup system 310 can send a check query to a source of a respective component, which can send a check result response to the smart setup system 310. For example, the smart setup system 310 can run a checking script to execute a check function (e.g., xmake-check.sh), to issue a check query that includes the id, the platform, and the version provided in the data object of the respective component. In some examples, the source is at least partially identified based on the URL (e.g., https://github.wdf.sap-.corp/dtxmake/xmake) associated with the component.

In some examples, in response to the check query, the source returns a check result that indicates the availability of the component in the specified version and platform at the source. An example check result can include a flag with a value indicating availability (e.g., 0 indicating that the component in the specified version and platform is not available; 1 indicating that the component in the specified version and platform is not available). Another example checks result can include a set of flags with respective values indicating availability (e.g., a component flag of 0 or 1 indicating un-/availability of the component, a version flag of 0 or 1 indicating un-/availability of the specified version of the component, a platform flag of 0 or 1 indicating un-/availability of the component for the specified platform).

In some implementations, the check results are displayed to the user 350 in the pre-requisite check UI. In some examples, the check result for a component can include a graphical treatment indicating whether the pre-requisites for the component are met (e.g., a green checkmark indicating that the pre-requisites are met, a red X indicating that the pre-requisites are not met). In some examples, if one or more pre-requisites are not met, the pre-requisite check UI can indicate those that are not met (e.g., version 1.1.10 is unavailable, iOS platform is unavailable).

With regard to environment setup, environment setup is executed to install components in one or more environments (e.g., cloud environment 320, the on-premise environment 322, the on-device environment 324 of FIG. 3). In some examples, the user 350 can select individual or all components for installation (e.g., by selecting respective UI elements, such as individual select boxes or a select all box). In some examples, installation is executed only for components that have all pre-requisites met. In some examples, installation is performed only for components indicated by the user 350. In some examples, if the user 350 selects all, installation is performed for all components. In some examples, if multiple components are to be installed (e.g., the user 350 selects all), the components are installed recursively, also accounting for nested components, if any. For example, components can be installed in an order that the components are identified in the component configuration file. However, for any component having one or more nest components, the nested component(s) are installed (e.g., in nesting order) before moving on to any other component(s) in the order.

In response to a request to install a component, the smart setup system 310 can execute the respective installation script. In some examples, installation can include setting up the environment that the component is to be deployed to. For example, the installation script can indicate facilities, shells (e.g., Unix shell, MacOS shell), and the like that are to be provided in the environment for execution of the component. With non-limiting reference to the example of Listing 6, the Python package manager pip3 is to be installed in the environment. In some examples, installation of the component includes retrieving the component (i.e., of the specified version and platform) from the respective source, importing the component to the environment (e.g., to the cloud environment 320, to the on-premise environment 322, to the on-device environment 324), and installing the component in the environment. In some examples, if an error occurs in installation, the environment can send an error report to the smart setup system 310, which can record the error in a log.

In some examples, the file header of the component configuration metadata file specifies the operating system and version requirements of all components listed therein this file. In some examples, the file header specifies whether it can support a physical machine, a virtual machine, a container, and the like. An example file header is provided as:

---
Listing 7: Example File Header
---
```
"os": "ubuntu",
"version": "20.04",
"vm": "true",
"docker": "true",
```
---

In some examples, which physical machine, virtual machine, or cloud container to install components on can be determined by the cloud account administrator.

In some implementations, installation results are displayed to the user 350 in an installation check UI. In some examples, the installation result for a component can include a graphical treatment indicating whether the component was successfully installed (e.g., a green checkmark indicating that the component was successfully installed, a red X indicating that the component was not successfully installed).

Figure 4A:
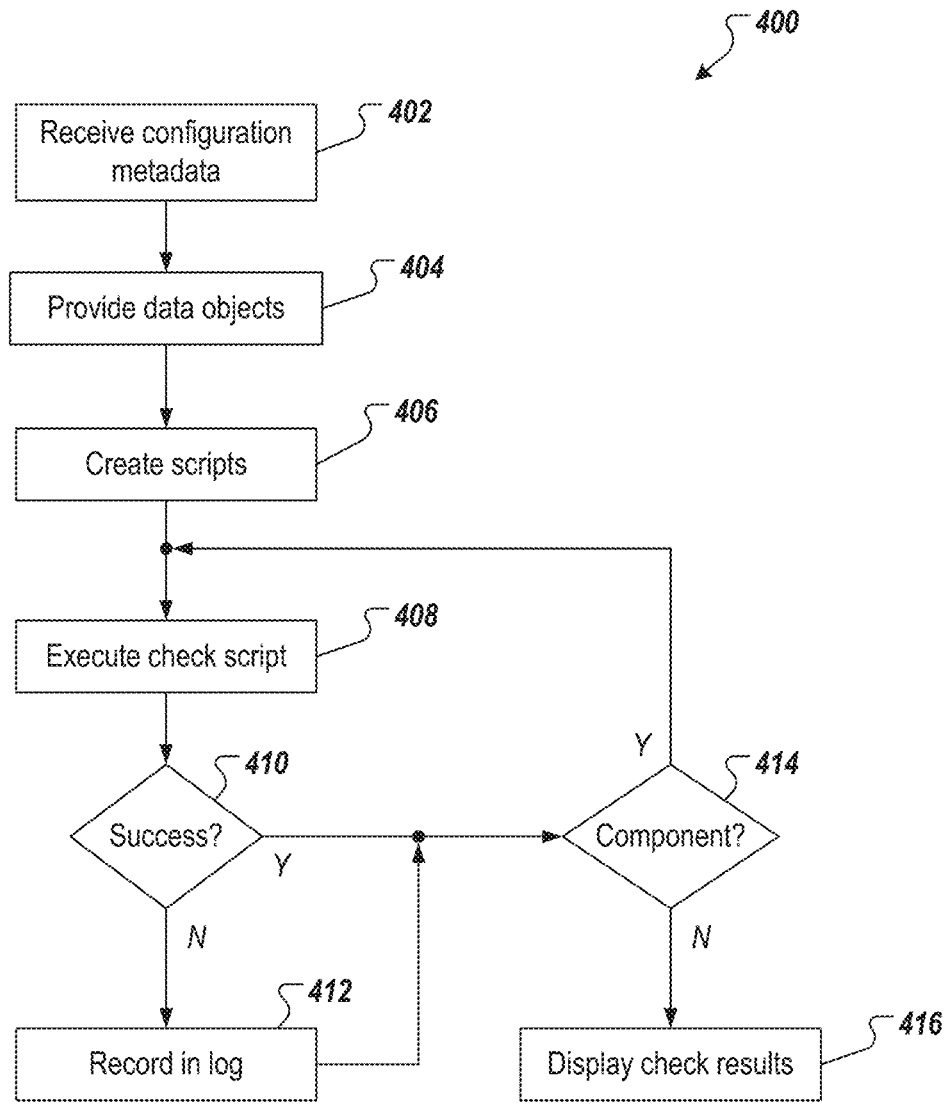
FIGS. 4A and 4B depict example processes that can be executed in accordance with implementations of the present disclosure.

FIG. 4A depicts an example process 400 that can be executed in accordance with implementations of the present disclosure. In some examples, the example process 400 is provided using one or more computer-executable programs executed by one or more computing devices. In some examples, the example process 400 is executed for pre-requisite checking in accordance with implementations of the present disclosure.

Configuration metadata is received (402). For example, and as described herein, the smart setup system 310 of FIG. 3 retrieves a component configuration metadata file from the repository 312, the component configuration metadata file corresponding to an application. In some examples, the component configuration metadata file can be retrieved based on an identifier that uniquely identifies the application. Data objects are provided (404). For example, and as described herein, the parser 310 parses the metadata stored within the component configuration metadata file to identify components, and any sub-components thereof. In some examples, for each component represented in the component configuration metadata file, the parser provides a data object (e.g., a Javascript Object). In some examples, the data object stores properties and functions of a respective component.

Scripts are created (406). For example, and as described herein, the data objects are provided as input to the emitter 316, which retrieves, for each component, a checking script template and an installation script template, and provides a checking script and an installation script, respectively. For example, the emitter 316 can query the script repository 306 using a query that indicates properties of a component (e.g., id, platform, version) and the script repository 306 can return a query result that includes a checking script template and an installation script template for the respective component. In some examples, each template includes one or more template variables. In some examples, the emitter 316 replaces the template variable(s) with respective value(s) to provide a checking script and an installation script, respectively.

Checking scripts are executed (408). For example, and as described herein, for each component, the smart setup system 310 executes a checking script to check pre-requisites of a respective component. The smart setup system 310 can send a check query to a source of a respective component, which can send a check result response to the smart setup system 310. In some examples, in response to the check query, the source returns a check result that indicates the availability of the component in the specified version and platform at the source. It is determined whether the pre-requisite check was successful (410). For example, and as described herein, the check result can indicate whether the pre-requisites of the component are met. If the pre-requisite check was not successful, a record is made in a log (412).

It is determined whether another component is to be checked (414). For example, the smart setup system 310 can determine whether a pre-requisite check is to be performed for any further components. If another component is to be checked, the example process 400 loops back. If there are no more components to be checked, check results are displayed (416). For example, and as described herein, the check results are displayed to the user 350 in the pre-requisite check UI. In some examples, the check result for a component can include a graphical treatment indicating whether the pre-requisites for the component are met (e.g., a green checkmark indicating that the pre-requisites are met, a red X indicating that the pre-requisites are not met). In some examples, if one or more pre-requisites are not met, the pre-requisite check UI can indicate those that are not met (e.g., version 1.1.10 is unavailable, iOS platform is unavailable).

Figure 4B:
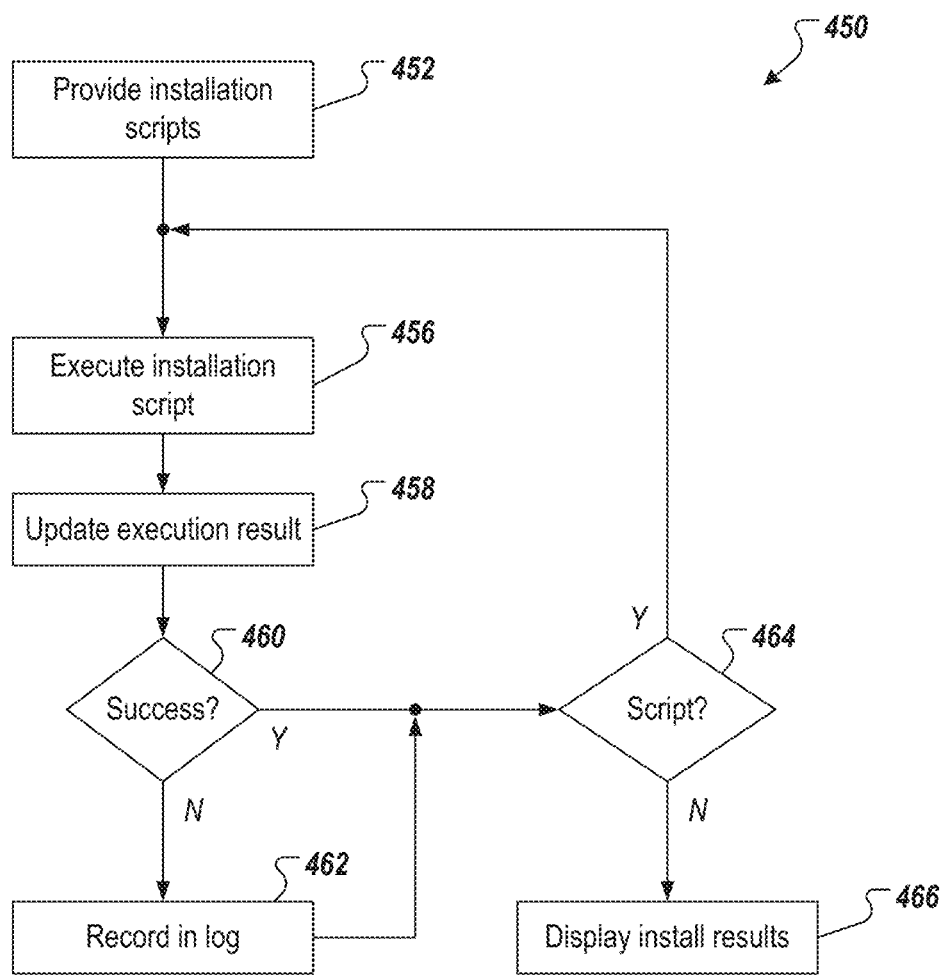

FIG. 4B depicts an example process 450 that can be executed in accordance with implementations of the present disclosure. In some examples, the example process 450 is provided using one or more computer-executable programs executed by one or more computing devices. In some examples, the example process 450 is executed for environment setup (component installation) in accordance with implementations of the present disclosure.

Installation scripts are provided (452). For example, and as described herein, the data objects are provided as input to the emitter 316, which retrieves, for each component, a checking script template and an installation script template, and provides a checking script and an installation script, respectively. For example, the emitter 316 can query the script repository 306 using a query that indicates properties of a component (e.g., id, platform, version) and the script repository 306 can return a query result that includes a checking script template and an installation script template for the respective component. In some examples, each template includes one or more template variables. In some examples, the emitter 316 replaces the template variable(s) with respective value(s) to provide a checking script and an installation script, respectively.

An installation script is executed (456). For example, and as described herein, the smart setup system 310 can execute an installation script for a respective component. In some examples, installation can include setting up the environment that the component is to be deployed to. For example, the installation script can indicate facilities, shells (e.g., Unix shell, MacOS shell), and the like that are to be provided in the environment for execution of the component. In some examples, installation of the component includes retrieving the component (i.e., of the specified version and platform) from the respective source, importing the component to the environment (e.g., to the cloud environment 320, to the on-premise environment 322, to the on-device environment 324), and installing the component in the environment.

An execution result is updated (458). For example, and as described herein, if an error occurs in installation, the environment can send an error report to the smart setup system 310, which can record the error in a log. It is determined whether installation of the component was successful (460). For example, and as described herein, the smart setup system 310 can check the error report. If installation was not successful, a record is made in a log (462). It is determined whether another installation script is queued for execution (464). If another installation script is queued for execution, the example process 450 loops back. If there are no more installation scripts to execute, installation results are displayed (466). For example, and as described herein, installation results are displayed to the user 350 in an installation check UI. In some examples, the installation result for a component can include a graphical treatment indicating whether the component was successfully installed (e.g., a green checkmark indicating that the component was successfully installed, a red X indicating that the component was not successfully installed).

Figure 5:
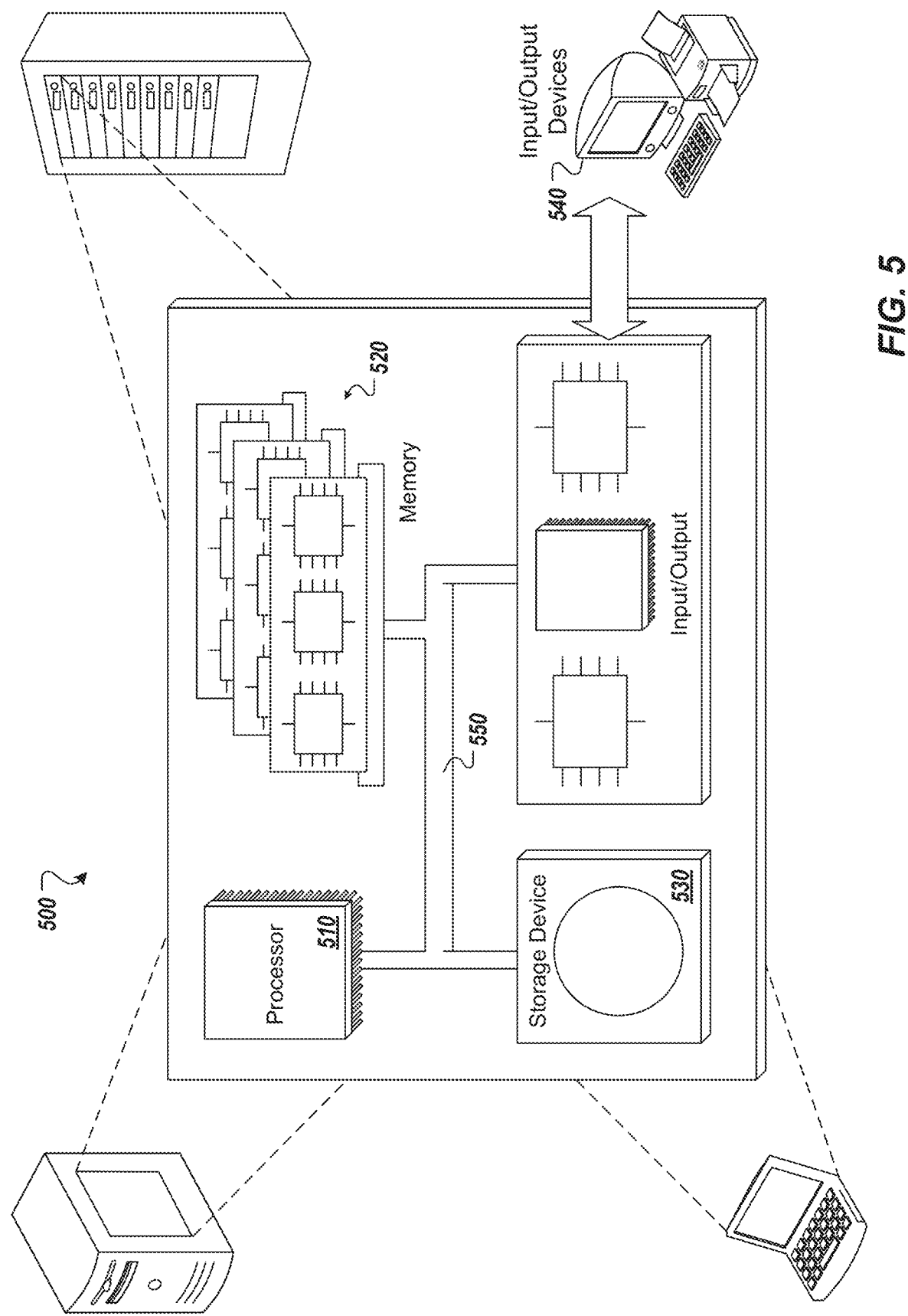
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for checking and installing a set of components to one or more environments, the method being executed by one or more processors and comprising:
   retrieving, by a smart setup system, a component configuration metadata file corresponding to an application, the component configuration metadata file comprising component metadata representing components in the set of components that the application uses during runtime;
   parsing, by a parser of the smart setup system, the component configuration metadata file to provide a set of data objects, each data object corresponding to a respective component in the set of components and comprising a locator for a source of the respective component and a check function that is specific to a type of the respective component;
   providing, by an emitter of the smart setup system, a set of checking scripts and a set of installation scripts, for each component in the set of components, providing a checking script and an installation script using a respective data object; and
   executing, by the smart setup system, each checking script in the set of checking scripts by, for each component, executing the check function to query the source using the locator for the source, and in response, receiving a set of check results, each check results indicating whether pre-requisites of the respective component are met.

2. The method of claim 1, wherein a data object comprises, for the respective component, a set of properties and a set of functions comprising the check function.

3. The method of claim 1, wherein providing the checking script and an installation script comprises receiving a checking script template and an installation script template from a template repository, and replacing one or more template variables in each of the checking script template and the installation script template with component metadata to provide the checking script and the installation script.

4. The method of claim 1, further comprising executing, by the smart setup system, each checking script in the set of checking scripts to install the respective component to one or more environments.

5. The method of claim 1, wherein the one or more environments comprise a cloud environment, an on-premise environment, and an on-device environment.

6. The method of claim 1, wherein the application depends on the components in the set of components.

7. The method of claim 1, wherein the pre-requisites comprise a version and a platform.

8. A non-transitory computer-readable storage medium coupled to one or more processors and having instructions stored thereon which, when executed by the one or more processors, cause the one or more processors to perform operations for checking and installing a set of components to one or more environments, the operations comprising:
   retrieving, by a smart setup system, a component configuration metadata file corresponding to an application, the component configuration metadata file comprising component metadata representing components in the set of components that the application uses during runtime;

parsing, by a parser of the smart setup system, the component configuration metadata file to provide a set of data objects, each data object corresponding to a respective component in the set of components and comprising a locator for a source of the respective component and a check function that is specific to a type of the respective component;

providing, by an emitter of the smart setup system, a set of checking scripts and a set of installation scripts, for each component in the set of components, providing a checking script and an installation script using a respective data object; and executing, by the smart setup system, each checking script in the set of checking scripts by, for each component, executing the check function to query the source using the locator for the source, and in response, receiving a set of check results, each check results indicating whether pre-requisites of the respective component are met.

9. The non-transitory computer-readable storage medium of claim 8, wherein a data object comprises, for the respective component, a set of properties and a set of functions comprising the check function.

10. The non-transitory computer-readable storage medium of claim 8, wherein providing the checking script and the installation script comprises receiving a checking script template and an installation script template from a template repository, and replacing one or more template variables in each of the checking script template and the installation script template with component metadata to provide the checking script and the installation script.

11. The non-transitory computer-readable storage medium of claim 8, wherein operations further comprise executing, by the smart setup system, each checking script in the set of checking scripts to install the respective component to one or more environments.

12. The non-transitory computer-readable storage medium of claim 8, wherein the one or more environments comprise a cloud environment, an on-premise environment, and an on-device environment.

13. The non-transitory computer-readable storage medium of claim 8, wherein the application depends on the components in the set of components.

14. The non-transitory computer-readable storage medium of claim 8, wherein the pre-requisites comprise a version and a platform.

15. A system, comprising:
a computing device; and
a computer-readable storage device coupled to the computing device and having instructions stored thereon which, when executed by the computing device, cause the computing device to perform operations for checking and installing a set of components to one or more environments, the operations comprising:

retrieving, by a smart setup system, a component configuration metadata file corresponding to an application, the component configuration metadata file comprising component metadata representing components in the set of components that the application uses during runtime;

parsing, by a parser of the smart setup system, the component configuration metadata file to provide a set of data objects, each data object corresponding to a respective component in the set of components and comprising a locator for a source of the respective component and a check function that is specific to a type of the respective component;

providing, by an emitter of the smart setup system, a set of checking scripts and a set of installation scripts, for each component in the set of components, providing a checking script and an installation script using a respective data object; and executing, by the smart setup system, each checking script in the set of checking scripts by, for each component, executing the check function to query the source using the locator for the source, and in response, receiving a set of check results, each check results indicating whether pre-requisites of the respective component are met.

16. The system of claim 15, wherein a data object comprises, for the respective component, a set of properties and a set of functions comprising the check function.

17. The system of claim 15, wherein providing the checking script and the installation script comprises receiving a checking script template and an installation script template from a template repository, and replacing one or more template variables in each of the checking script template and the installation script template with component metadata to provide the checking script and the installation script.

18. The system of claim 15, wherein operations further comprise executing, by the smart setup system, each checking script in the set of checking scripts to install the respective component to one or more environments.

19. The system of claim 15, wherein the one or more environments comprise a cloud environment, an on-premise environment, and an on-device environment.

20. The system of claim 15, wherein the application depends on the components in the set of components.

* * * * *